United States Patent
Jansen et al.

(10) Patent No.: US 9,298,583 B2
(45) Date of Patent: Mar. 29, 2016

(54) NETWORK TRAFFIC BASED POWER CONSUMPTION ESTIMATION OF INFORMATION TECHNOLOGY SYSTEMS

(75) Inventors: Bernhard Jansen, Rueschlikon (CH); Oliver Boxler, Rueschlikon (CH); Dieter Gantenbein, Rueschlikon (CH); Michel Zedler, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 12/478,384

(22) Filed: Jun. 4, 2009

(65) Prior Publication Data

US 2010/0312874 A1    Dec. 9, 2010

(51) Int. Cl.
| | |
|---|---|
| G06F 15/173 | (2006.01) |
| G06F 1/00 | (2006.01) |
| G06F 11/34 | (2006.01) |
| G06F 11/30 | (2006.01) |
| H04L 12/26 | (2006.01) |
| H04L 12/24 | (2006.01) |

(52) U.S. Cl.
CPC ........ *G06F 11/3495* (2013.01); *G06F 11/3006* (2013.01); *G06F 11/3062* (2013.01); *G06F 11/3096* (2013.01); *H04L 41/0213* (2013.01); *H04L 41/0631* (2013.01); *H04L 43/0817* (2013.01); *G06F 2201/86* (2013.01); *Y02B 60/165* (2013.01)

(58) Field of Classification Search
USPC ................................... 713/300–340; 709/224
See application file for complete search history.

(56) References Cited

U.S. PATENT DOCUMENTS

| | | | |
|---|---|---|---|
| 6,360,260 B1 | 3/2002 | Compliment et al. | |
| 6,633,909 B1* | 10/2003 | Barrett et al. | 709/224 |
| 7,337,334 B2 | 2/2008 | Kuhlmann et al. | |
| 7,400,252 B2 | 7/2008 | Larson et al. | |
| 7,472,293 B2* | 12/2008 | Kuhlmann et al. | 713/300 |
| 7,483,815 B2 | 1/2009 | Palma et al. | |
| 7,502,948 B2* | 3/2009 | Rotem et al. | 713/300 |
| 7,529,821 B1* | 5/2009 | Cannon et al. | 709/223 |
| 2007/0101173 A1* | 5/2007 | Fung | 713/300 |
| 2007/0240006 A1* | 10/2007 | Fung | 713/323 |
| 2008/0141048 A1* | 6/2008 | Palmer et al. | 713/300 |
| 2008/0294920 A1* | 11/2008 | Hatasaki et al. | 713/323 |
| 2009/0049510 A1 | 2/2009 | Zhang et al. | |
| 2010/0023598 A9* | 1/2010 | Ginter et al. | 709/217 |
| 2010/0205471 A1* | 8/2010 | Vavilala et al. | 713/340 |

OTHER PUBLICATIONS

Murtaza, Syed, "Applications of SNMP in Ubiquitous Environment" KNOM Review vol. 8, No. 2 Feb. 2006, p. 1-6.*

(Continued)

*Primary Examiner* — Aftab N. Khan
(74) *Attorney, Agent, or Firm* — Cantor Colburn LLP; Daniel Morris

(57) ABSTRACT

A method of estimating power consumption of one or more network connected devices configured within an information technology (IT) architecture includes monitoring network events occurring within the IT architecture over a defined time period; correlating the monitored network events with predetermined power profile operating point data associated with the one or more network connected devices, wherein the power profile operating point data is based on possible network event occurrences within the IT architecture; and based on the correlating, generating an estimated energy usage of the one or more network connected devices for the defined time period.

15 Claims, 3 Drawing Sheets

(56) References Cited

OTHER PUBLICATIONS

IBM Tivoli Monitoring; Tivoli software, IBM; 2006.
N. Rasmussen; "Implementing Energy Efficient Data Centers;" White Paper #114 APC Legendary Reliabiltiy; 2006.
W. L. Bircher et al.; "Complete System Power Estimation: A Trickle-Down Approach Based on Performance Events;" IEEE International Symposium on Performance Analysis of Systems & Software, 2007. ISPASS 2007.
Sundeep Bajikar, "Trusted Platform Module (TPM) based Security on Notebook PCs—White Paper," Mobile Platforms Group; Intel Corporation; pp. 1-20; Jun. 2002.
International Search Report; International Application No. PCT/IB2010/051027; International Filing Date: Oct. 3, 2010; Date of Mailing: Sep. 23, 2010.
International Search Report—Written Opinion; International Application No. PCT/IB2010/051027; International Filing Date: Oct. 3, 2010; Date of Mailing: Sep. 23, 2010.

* cited by examiner

NETWORK TRAFFIC BASED POWER CONSUMPTION ESTIMATION OF INFORMATION TECHNOLOGY SYSTEMS

BACKGROUND

The present invention relates generally to information technology (IT) systems and, more particularly, to network traffic based power consumption estimation of IT systems.

IT professionals are continually faced with mounting challenges due to, for example, rising energy costs, data center complexity and mounting demands from business units, each of which can curtail an organization's ability to grow. In addition, the recent "green technology" movement (which encompasses a continuously evolving group of methods and materials, from techniques for generating energy to non-toxic cleaning products) has led to efforts in promoting "green computing" given that IT environments are becoming more and more power and cost intense in their operation. In particular, developments in green computing technologies have been driven by high-density computing, increasing server counts, and the enlargement of cooling and uninterruptible power supply capacities.

One major problem in optimizing power consumption is that in a conventional IT environment, the power consumption distribution among different IT components is unknown. As a result, monthly or yearly billed electrical costs can not be linked with particular deployment decisions or operating practices. Typically, responsible managers can only track and control power consumption based on the basic knowledge of which components go into facilities, cooling, IT, etc. In the case of IT in particular, it is often the case that little is known as to what IT components are using which amounts of power.

SUMMARY

In an exemplary embodiment, a method of estimating power consumption of one or more network connected devices configured within an information technology (IT) architecture includes monitoring network events occurring within the IT architecture over a defined time period; correlating the monitored network events with predetermined power profile operating point data associated with the one or more network connected devices, wherein the power profile operating point data is based on possible network event occurrences within the IT architecture; and based on the correlating, generating an estimated energy usage of the one or more network connected devices for the defined time period.

In another embodiment, a computer storage medium having computer readable instructions stored thereon that, when executed by a computer, implement a method of estimating power consumption of one or more network connected devices configured within an information technology (IT) architecture, wherein the method includes monitoring network events occurring within the IT architecture over a defined time period; correlating the monitored network events with predetermined power profile operating point data associated with the one or more network connected devices, wherein the power profile operating point data is based on possible network event occurrences within the IT architecture; and based on the correlating, generating an estimated energy usage of the one or more network connected devices for the defined time period.

In another embodiment, a system for estimating power consumption of one or more network connected devices configured within an information technology (IT) architecture includes an IT event monitoring system configured within the IT architecture that monitors network events occurring within the IT architecture over a defined time period; and a management station within the IT architecture, the management station configured to correlate the monitored network events with predetermined power profile operating point data associated with the one or more network connected devices, wherein the power profile operating point data is based on possible network event occurrences within the IT architecture; and wherein the management station is configured to generate, based on the correlating, an estimated energy usage of the one or more network connected devices for the defined time period.

BRIEF DESCRIPTION OF THE SEVERAL VIEWS OF THE DRAWINGS

Referring to the exemplary drawings wherein like elements are numbered alike in the several Figures.

DETAILED DESCRIPTION

With respect to the issue of power consumption of IT systems, one straightforward solution may simply be to directly track system power consumption through the installation of energy meters at various locations within the system. However, as a practical matter, such an approach is unfeasible because of the large number of meters that would be required, as well as the disruptive nature of installing the meters in a running data center. In addition, the data collection from the energy meters would, as a practical matter, require some kind of network connectivity. Moreover, such meters are also expensive and draw energy themselves, thus (to a certain extent) defeating their intended purpose of reducing overall power consumption.

Although some of the more modern power managed servers and network components may have built-in power meters and interfaces for remotely accessing the power data, there are still many legacy systems that would not be able to be included in a power consumption analysis without being retrofitted with additional hardware (e.g., meters) that can provide the data needed for energy management.

Finally, there are local software agents capable of estimating current energy consumption based on system (CPU) load. However, such agents may not be available for all operating system platforms, and the installation of energy data collection agents may be problematic with respect to obtaining appropriate authorization (credentials) to do so. This may be particularly problematic in many enterprise environments.

Accordingly, disclosed herein is a method and system that estimates power consumption of a computing system or other network connected device by observing network traffic records, network traffic events or other monitoring activities/events such as SNMP (Simple Network Management Protocol) information. By directly monitoring event data instead of directly monitoring power usage, the event data may then be correlated with or mapped to previously determined power profile operating point (state) data, thereby providing a real time estimate of present power consumption. In the embodiments described herein, a generic approach may be followed, in that no particular hardware features or network access privileges are assumed. Moreover, other than computational power for the estimation itself, the present embodiments may be completely passive with respect to the network.

Figure 1:
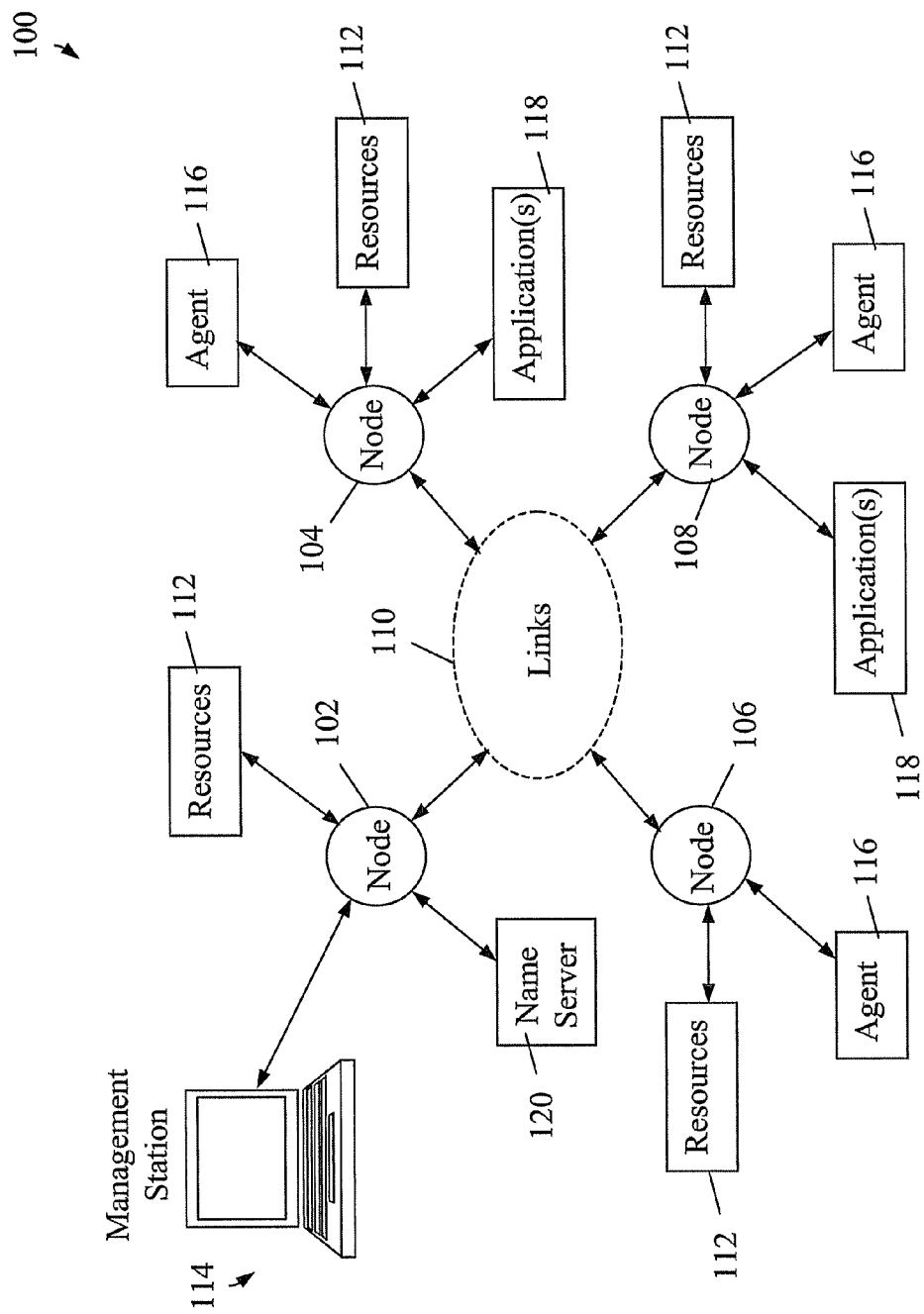
FIG. 1 is a schematic diagram of an exemplary IT network in which embodiments of the invention may be implemented.

Referring initially to FIG. 1, there is shown a schematic diagram of an exemplary IT network 100, in which embodiments of the invention may be implemented. As is shown, the network 100 features a plurality of nodes 102, 104, 106, and 108. Each node represents a network device, such as for example a computer or any data processing system which is capable of executing various tasks and processes, including that of sending messages to other nodes and responding to messages from other nodes. In addition, the network 100 may be of any one or a mixture of various network technologies, including token ring, Ethernet, point-to-point, satellite links, etc. A defined path or linkage between a given node and any of the other nodes in the network 100 is represented by network connection links 110 shown in FIG. 1. The connection links 110 may be established using any communication medium commonly used in networks, including, for example, buses between computers, telephone lines, T1 trunk connections, satellite links, or other such links.

The network 100 of FIG. 1 may comprise what is generally termed a local area network (LAN) or wide area network (WAN), as well as combinations of LANs and WANs. Further, each of the nodes 102-108 may be connected to other nodes or terminals e.g., workstations, desktop computers, printers, system resources, etc., (not shown) through local area networks or the like. Thus, it should be understood that the exemplary network 100 may have a large number of nodes that are spread over sites that may be local or separated by long distances. The network 100 may also support or utilize TCP/IP as its transmission protocol.

As also shown in FIG. 1, various network resources 112 are connected to the nodes 102-108, which resources 112 may include, for example, printers, bulk storage facilities, processing devices, communications links to other networks, name servers, or servers of various types. In an exemplary embodiment, the network resources 112 are accessible by all nodes in the network 100. Each of the nodes 102-108 and network resources 112 has a status that can be reported to a network manager 114, such as through a local (network) agent 116. The local agents 116 and network manager 114 may utilize a Simple Network Management Protocol (SNMP) in the discovery process, in which case the local agents 116 are therefore hereinafter interchangeably referred to as SNMP agents.

The nodes 102-108 may have application(s) software 118 executing thereon. For example, a given node may have a network interface program running thereon, for sending and receiving network traffic (messages) using various protocols. A user of the SNMP agent 116 for this node is thus able to place addressing information and other types of information in a SNMP trap, which can be transferred on the network by standard SNMP trap alarm message. Finally, in order for the network manager 114 to establish connections with each agent 116, configuration information such as network node address is available through a name server (or database) 120 configured as a resource to the network manager 114. In an exemplary embodiment, the name server 120 maintains a database of the name and address of each potentially active/discovered node or resource on the network 100.

As indicated above, the exemplary power estimation method embodiments correlate between events (e.g., network traffic records, network traffic events, monitoring data from monitoring agents from monitoring systems running on a observed system, SNMP trap alarms from network devices such as switches, routers, monitoring devices and other events which allow inference on the processing load of a device) and previously determined operation points for classified target systems and the power consumption at those operation points. As such, the energy usage of the specific operation points (including rise and fall periods) are profiled per system type in advance to produce power profile operating point data. In contrast to existing energy measuring solutions, no special hardware support such as a Baseline Management Controller (BMC) is required or a specialized meter. Moreover, no additional credentials, software or other configurations are required for the estimation process.

Figure 2:
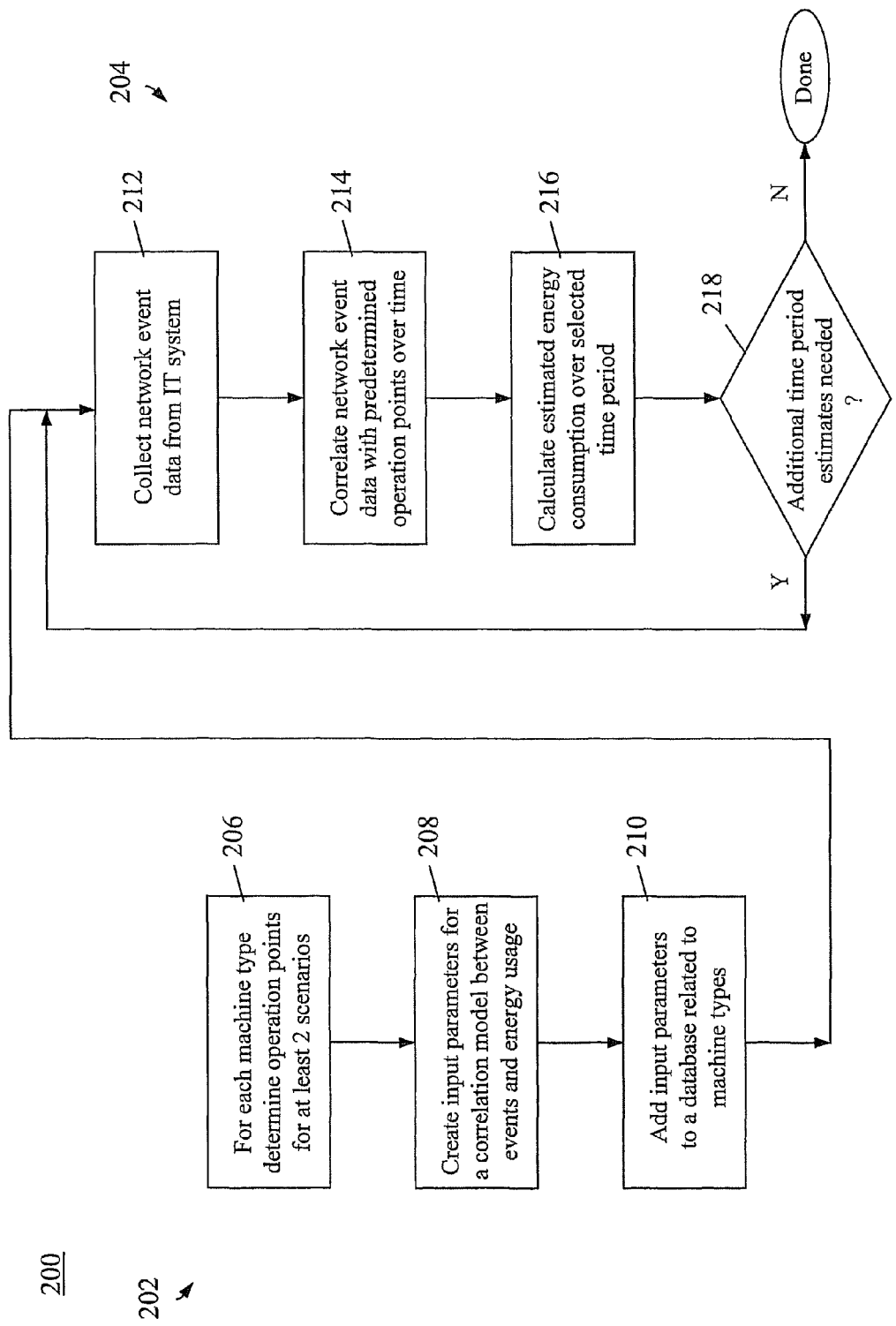
FIG. 2 is a process flow diagram illustrating a method of estimating power consumption of an IT system, in accordance with an embodiment of the invention.

Referring now to FIG. 2, there is shown a process flow diagram illustrating a method 200 of estimating power consumption of an IT system (such as that shown in FIG. 1), in accordance with an embodiment of the invention. In the present embodiment, it is assumed that: (1) the system types and hardware for all systems in the IT environment are known, (2) the relationships between the physical systems and their IP addresses are known, and (3) there is access to any necessary event data.

Generally, the method 200 may initially include a "preparation" phase 202 for determining the above discussed power profile operating point data, and a real-time "production" usage phase 204 in which network event data is monitored and correlated with the power profile operating point data in order to generate the estimated energy consumption usage over time. Beginning at block 206, for each specific machine type in the IT environment, a power profile is obtained that includes operation points for at least two scenarios or states that are possible, based on network event occurrences within the IT environment. A very basic example of the two states would be power data for a machine idle state of operation and a maximum load state of operation. However, it would be advantageous to determine several operation points as a result of a defined event, such as a defined network load on the machine or a defined reaction to any other event. This will also make the power consumption estimations more accurate.

Based on the determined operation points, input parameters for a correlation model between network events and energy usage are created, as shown in block 208 of FIG. 2. These input parameters are then entered into a database or other type of lookup table, as shown in block 210. Once the database is populated with the operation point data for the IT environment hardware, actual event monitoring and power estimation for the system can then take place.

Proceeding to block 212 of FIG. 2, the real-time "production" phase 204 of method 200 begins by collecting network event data from the IT system. The collection of such data may be implemented through any known IT event monitoring system technologies such as, for example, IBM's line of Tivoli® Monitoring products or network event collection or network traffic record collection by, for example, IBM Aurora. As this event data is collected, the events are then correlated with the predetermined operation points over time in block 214. The operation points that have taken place over time may be tabulated or presented in a graphical form, for example, so that for a specific point in time, t, it is possible to determine events (and thus power consumption) at that time. In block 216, total estimated energy consumption for a selected time period is calculated through knowledge of the monitored operation points of the system during that time, in conjunction with the predetermined power profile data for those operation points. In the event additional time period calculations are desired as reflected in decision block 218, the method returns to block 212 for additional network activity data collection.

Figure 3:
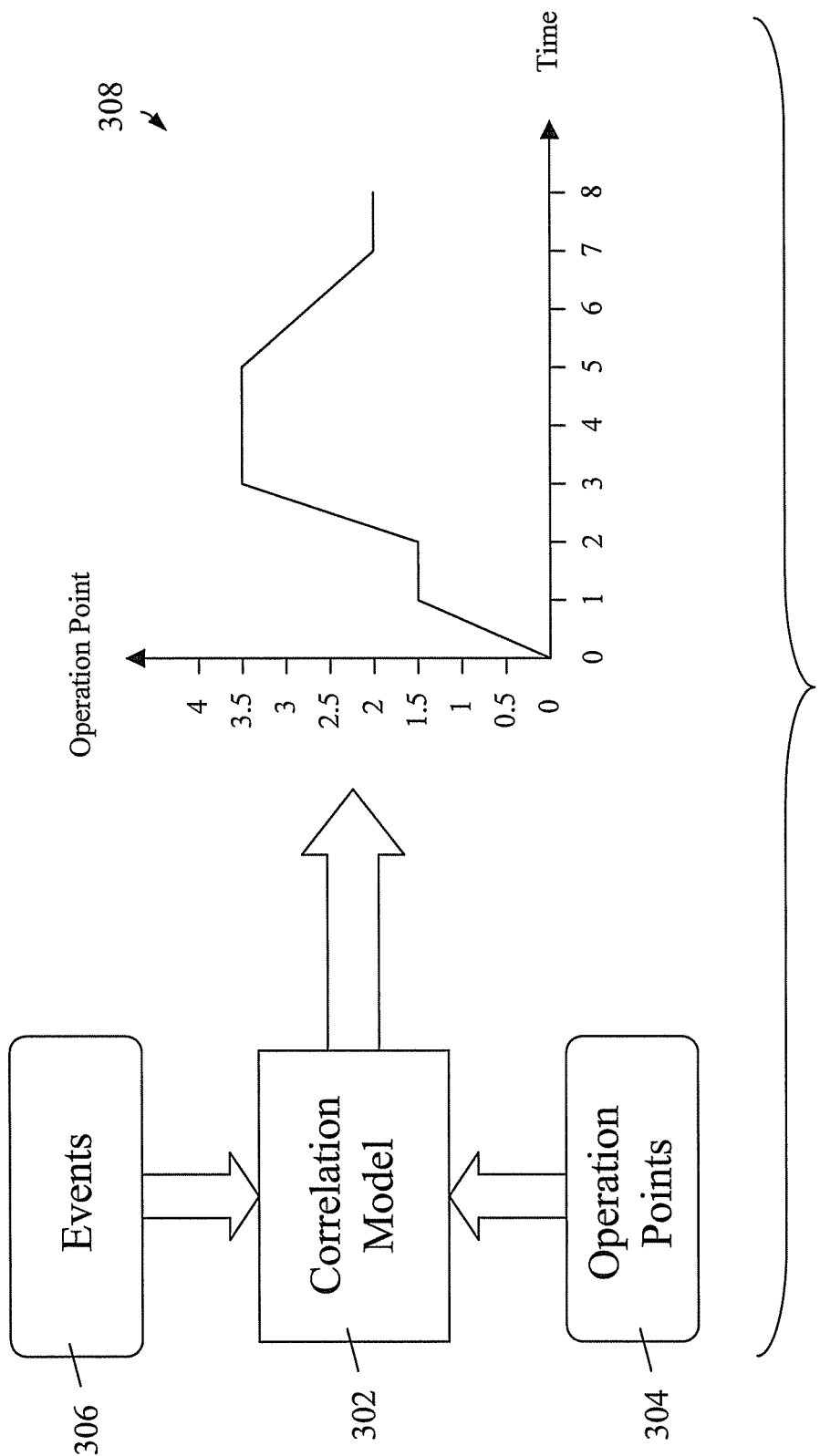
FIG. 3 is a graph depicting an exemplary power profile estimation over a time period, through the use of a correlation model.

FIG. 3 is a graph depicting an exemplary power profile estimation over a time period, through the use of a correlation model 302 that may be executed (for example) by the management station 114 of FIG. 1. Again, the correlation model 302 receives predetermined operation point data 304 as first inputs thereto and real-time events data 306 as second inputs thereto. From these inputs, a graph 308 may be generated to track the operation points (and thus energy usage) of a given network device over a defined time period.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIG. 2.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of estimating power consumption of one or more network connected devices configured within an information technology (IT) architecture, the method comprising:
    monitoring, with a computing device, network events occurring within the IT architecture over a defined time period;
    correlating the monitored network events with predetermined power profile operating point data associated with the one or more network connected devices, wherein the power profile operating point data is based on possible network event occurrences within the IT architecture; and
    based on the correlating, generating an estimated energy usage of the one or more network connected devices for the defined time period, such that the estimated energy usage is based on direct monitoring of the network events and inference of processing loads of the one or more network connected devices without monitoring of power usage data of the one or more network connected devices.

2. The method of claim 1, wherein the network events include one of more of: network traffic data, network traffic record or Simple Network Management Protocol (SNMP) events.

3. The method of claim 1, further comprising generating the predetermined power profile operating point data and inputting the power profile operating point data into a database to be accessed during the correlating.

4. The method of claim 3, wherein the generating the predetermined power profile operating point data further comprises determining, for each specific machine type in the IT architecture, operation points for at least two states of operation that are possible, based on network event occurrences.

5. The method of claim 4, wherein the operation points for at least two states of operation comprise power data for a machine idle state of operation and a maximum load state of operation.

6. A non-transitory computer storage medium having computer readable instructions stored thereon that, when executed by a computer, implement a method of estimating power consumption of one or more network connected devices configured within an information technology (IT) architecture, wherein the method comprises:
    monitoring network events occurring within the IT architecture over a defined time period;
    correlating the monitored network events with predetermined power profile operating point data associated with the one or more network connected devices, wherein the power profile operating point data is based on possible network event occurrences within the IT architecture; and
    based on the correlating, generating an estimated energy usage of the one or more network connected devices for the defined time period, such that the estimated energy usage is based on direct monitoring of the network events and inference of processing loads of the one or more network connected devices without direct monitoring of power usage data of the one or more network connected devices.

7. The computer storage medium of claim 6, wherein the network events include one of more of: network traffic data, network traffic records or Simple Network Management Protocol (SNMP) events.

8. The computer storage medium of claim 6, wherein the method further comprises generating the predetermined power profile operating point data and inputting the power profile operating point data into a database to be accessed during the correlating.

9. The computer storage medium of claim 8, wherein the generating the predetermined power profile operating point data further comprises determining, for each specific machine type in the IT architecture, operation points for at least two states of operation that are possible, based on network event occurrences.

10. The computer storage medium of claim 9, wherein the operation points for at least two states of operation comprise power data for a machine idle state of operation and a maximum load state of operation.

11. A system for estimating power consumption of one or more network connected devices configured within an information technology (IT) architecture, comprising:
    an IT event monitoring system configured within the IT architecture that monitors network events occurring within the IT architecture over a defined time period; and
    a management station within the IT architecture, the management station configured to correlate the monitored network events with predetermined power profile operating point data associated with the one or more network connected devices, wherein the power profile operating point data is based on possible network event occurrences within the IT architecture; and
    wherein the management station is configured to generate, based on the correlating, an estimated energy usage of the one or more network connected devices for the defined time period, such that the estimated energy usage is based on direct monitoring of the network events and inference of processing loads of the one or more network connected devices without direct monitoring of power usage data of the one or more network connected devices.

12. The system of claim 11, wherein the network events include one of more of: network traffic data, network traffic record or Simple Network Management Protocol (SNMP) events.

13. The system of claim 11, wherein the predetermined power profile operating point data and the power profile operating point data are inputs into a database to be accessed during the correlating.

14. The system of claim 13, wherein the predetermined power profile operating point data further comprises, for each specific machine type in the IT architecture, operation points for at least two states of operation that are possible, based on network event occurrences.

15. The system of claim 14, wherein the operation points for at least two states of operation comprise power data for a machine idle state of operation and a maximum load state of operation.

* * * * *